(No Model.)
A. E. BOHN.
WEIGHING FLOUR BIN.
No. 553,606. Patented Jan. 28, 1896.
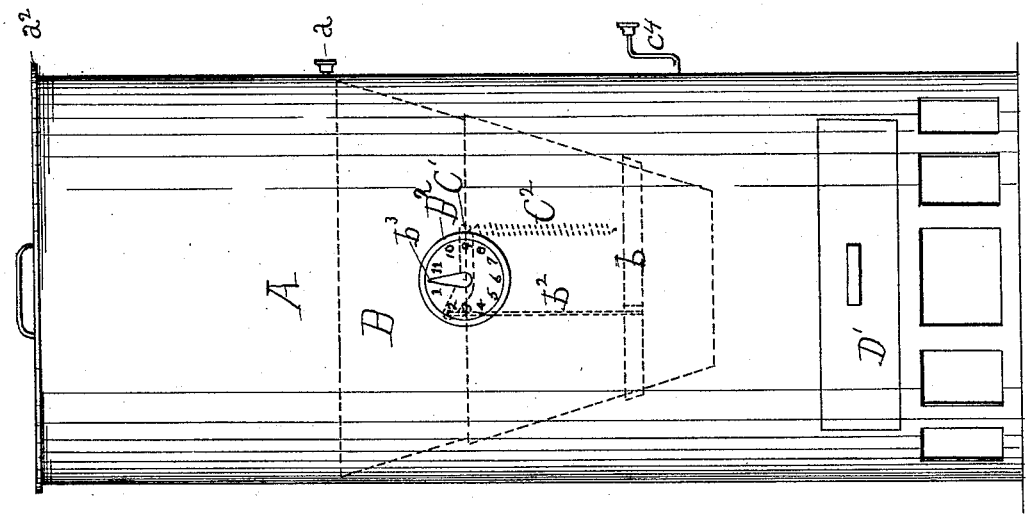
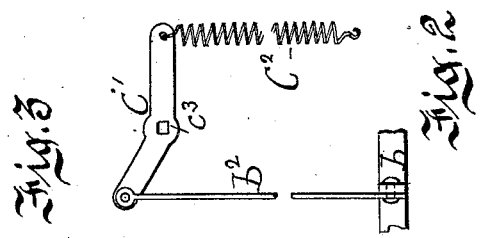
Fig. 3. Fig. 2.
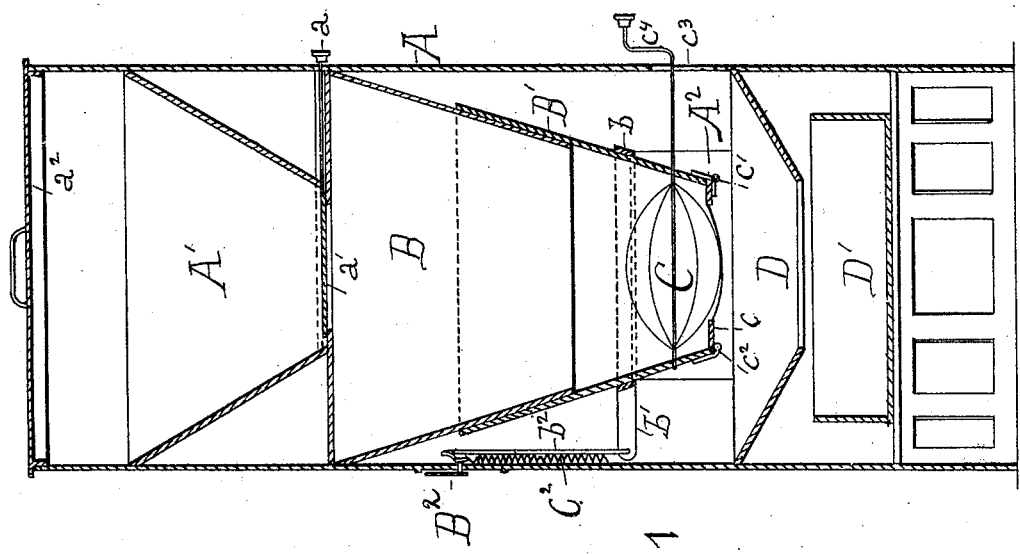
Fig. 1.
Witnesses
Lindsay deB. Little
Geo Taylor
Inventor
Adam E. Bohn
by J. H. Stevenson
Attorney

United States Patent Office.

ADAM E. BOHN, OF ALLEGHENY, PENNSYLVANIA.

WEIGHING FLOUR-BIN.

SPECIFICATION forming part of Letters Patent No. 553,606, dated January 28, 1896.

Application filed February 20, 1895. Serial No. 539,095. (No model.)

*To all whom it may concern:*

Be it known that I, ADAM E. BOHN, a citizen of the United States, residing at Allegheny, in the county of Allegheny and State of Pennsylvania, have invented certain new and useful Improvements in Weighing Flour-Bins; and I do hereby declare the following to be a full, clear, and exact description of the invention, such as will enable others skilled in the art to which it pertains to make and use the same, reference being had to the accompanying drawings, which form a part of this specification.

My invention relates to a flour-bin having a weighing device, so that any definite weight of flour can be taken out, as may be desired.

My flour-bin also includes a device, but such as is in common use, for sifting the flour, the whole being a weighing and sifting combination in connection with the flour-bin proper.

In the accompanying drawings, Figure 1 is a vertical section of my flour-bin. Fig. 2 is a detail of the weighing device, and Fig. 3 is a side view of the bin.

A represents the flour-bin can.

A' is the flour-compartment at the top of the bin.

$a$ is a valve-rod and $a'$ a valve attached thereto in the bottom of the compartment A.

$A^2$ is a door.

B is a chute to conduct the flour to the scales for weighing the same.

B' is the weighing-vessel, the upper end of which incloses the lower end of the chute B and is adapted to have vertical movement relative thereto.

$c$ is a sieve-bottom hinged at $c'$ by a suitable hinge and held at the opposite side by a proper snap or latch $c^2$. This bottom to the compartment B' is made of the usual wire for flour-sieves.

$a^2$ is the lid of the bin.

D is a chute to convey the sifted flour to the receptacle-box D'.

C is the rotary wire sifter, such as is in every-day use for sifting flour in connection with the fine-wire sieve.

$c^4$ is a handle to operate the sifter C.

$c^3$ is a slot in the side of the bin. This slot allows the axle of the sifter to move downward when the scale is weighted with flour. This scale in the drawings shows the scale in a normal position.

$b$ is a band around the compartment B', terminating in a rigid extension-piece $b'$. This latter piece, $b'$, is for the purpose of attachment to the rod $b^2$ of the indicator $B^2$. This attachment is rigidly made.

$C^2$ is the indicator-spring. C' is the lever for the same, on rod or axis $c^3$, on which the indicator-band $b^3$ is fixed.

The principal object of my invention is this weighing device, and the same may be effected by such a device as I show in the drawings. To show how this may be done I will explain the operation. Suppose there is a body of flour in the compartment A' and it is desired to draw out five pounds of the same. I draw on the valve-rod $a$, so as to allow the flour to flow out at the bottom. This will fall into the scales B', and when the required amount of flour is drawn out the indicator will show it. The sifter C may then be used to thoroughly sift the flour.

By means of the door $A^2$ the scales may be cleaned out.

The outer casing A incloses all the working parts so that the flour can be weighed and sifted without exposure.

Having thus described my invention, what I claim, and desire to secure by Letters Patent of the United States, is—

In a flour bin, the combination of an outer casing, a flour compartment within the casing having a valve controlled opening, a chute into which the said compartment discharges through said opening, a weighing vessel the upper end of which incloses the lower end of the chute and has vertical movement relative thereto, a support for the weighing vessel rigidly connected to the weighing scales, a sifter journaled in the lower portion of the weighing vessel, a rod to operate the sifter extending through an elongated opening in the casing of the flour bin whereby the vertical movement of the weighing vessel is unimpeded, a chute below the sifter, and a removable receptacle for the sifted flour, substantially as described.

In testimony that I claim the foregoing I hereunto affix my signature this 5th day of December, A. D. 1894.

ADAM E. BOHN. [L. S.]

In presence of—
S. L. KARUS,
GEO. TAYLOR.